United States Patent [19]

Valkama et al.

[11] 3,826,905
[45] July 30, 1974

[54] METHODS AND APPARATUS FOR PROVIDING AUTOMATIC CONTROL OF CHROMATOGRAPHIC FRACTIONATING PROCESSES

[75] Inventors: Aarne J. Valkama; Eero Sihvola, both of Helsinki; Risto V. Puttonen, Matinkyla; Rainer Nihtila, Kantvik; Matti Turunen, Kantvik; Lauri Hamalainen, Kantvik, all of Finland

[73] Assignee: Suomen Sokeri Osakeyhtio, Helsinki, Finland

[22] Filed: Oct. 27, 1971

[21] Appl. No.: 192,881

[52] U.S. Cl.......... 235/151.12, 235/151.35, 137/93, 127/46 R, 23/230 R
[51] Int. Cl............................................. C13d 3/14
[58] Field of Search........ 137/93, 88, 119, 2; 55/67, 55/197, 386; 356/116; 23/230; 235/151.35, 151.12

[56] References Cited
UNITED STATES PATENTS
3,411,342  11/1968  Liermann................................ 73/53
3,468,607  9/1969  Sloane et al. .................... 356/116 X
3,494,104  2/1970  Royer ..................................... 55/67
3,694,158  9/1972  Lauer et al. .................... 235/151.35

Primary Examiner—Eugene G. Botz
Attorney, Agent, or Firm—Brumbaugh, Graves, Donohue & Raymond

[57] ABSTRACT

As disclosed herein, the angle of optical rotation, concentration, flow rate and temperature of the components such as, for example, glucose and fructose in an aqueous solution emerging from a fractionating process are continuously measured and signals corresponding to the measurements are fed to a computer. The computer calculates the instantaneous and/or average purity and/or the expected purity of the components and, when predetermined purity values are reached, the computer controls the distribution of the various fractions in accordance with a preset program.

8 Claims, 11 Drawing Figures

FRUCTOSE FRACTION (F)

METHODS AND APPARATUS FOR PROVIDING AUTOMATIC CONTROL OF CHROMATOGRAPHIC FRACTIONATING PROCESSES

BACKGROUND OF THE INVENTION

This invention relates to methods and apparatus for the automatic control of industrial chromatographic processes and, more particularly, to methods and apparatus for providing automatic control of chromatographic fractionating processes.

When fractionating two or three substances chromatographically in columns or separation towers, the separation of the various components can be monitored using various measuring methods based on the physical and chemical properties of the components. Such properties include, for example, density, viscosity, refractive index, pH value, conductivity and polarization phenomena in optically active substances. Correspondingly, optimization of the fractionating process in terms of the purity of the fractionated substances is dependent upon the selection of the maximum rate of flow and the quantity and concentration of the initial solution for fractionating columns. As is understood, insufficiently separated fractions are recycled back into the process.

The measurements of the concentration of the complete substance and the concentrations of the components are generally required to control the fractionating process efficiently. Analysis of the component concentrations depends upon many factors, not the least of which is temperature. A great deal of calculation is necessary to define the components with sufficient accuracy as the measured properties seldom have linear functions with, for example, concentration or temperature.

A description is given in British Pat. No. 1,095,210 of how the concentrations of the various components of glucose-fructose in aqueous solution are determined by means of the angle of optical rotation and refractive index. It is however difficult to achieve a reliable method of direct automatic control with any known methods, as the measured properties are effected, inter alia, by concentration and temperature. In addition, with glucose and fructose for example, polarimeter readings (angles of optical rotation) are of opposite sign. Because of this, the concentration of the fructose and/or glucose in the fractionated sugar solution cannot be individually expressed by any of the measurements mentioned, a condition necessary for the control of the fractionating process.

SUMMARY OF THE INVENTION

Accordingly it is an object of the present invention to provide a method and apparatus for the automatic control of an industrial chromatographic process that overcomes the above-mentioned difficulties.

It is another object of the present invention to provide a method and apparatus for the automatic control of an industrial chromatographic process that supplies as an output at least two fractions of predetermined high purity and one fraction which is recycled in the process.

These and other objects of the present invention are accomplished by continuously measuring the angle of optical rotation, the concentration, flow rate and temperature of the fractions emerging from a fractionating process. Signals corresponding to the measurements are supplied to a data processor which calculates the instantaneous and/or average purity and/or the expected purity. In response to the calculated purity value, the data processor controls the distribution of the various fractions in accordance with a preset program.

In a preferred embodiment of the present invention, signals representative of the angle of optical rotation, concentration, flow rate and temperature measured at the output of the process are coupled to a computer via an analogue-to-digial converter. Signals indicating the positions of the feed valves at the input of the process and of the distribution valves at the output of the process are fed to the computer via a digital input controller. This computer is programmed to respond to the average, instantaneous and expected purity values of the emerging fractions for controlling the actuation of the distribution valves whereby optimization of distribution is achieved. The system computer operates on-line to continuously obtain the required data and handles the data according to the said program.

DESCRIPTION OF THE PREFERRED EMBODIMENT

Figure 1:
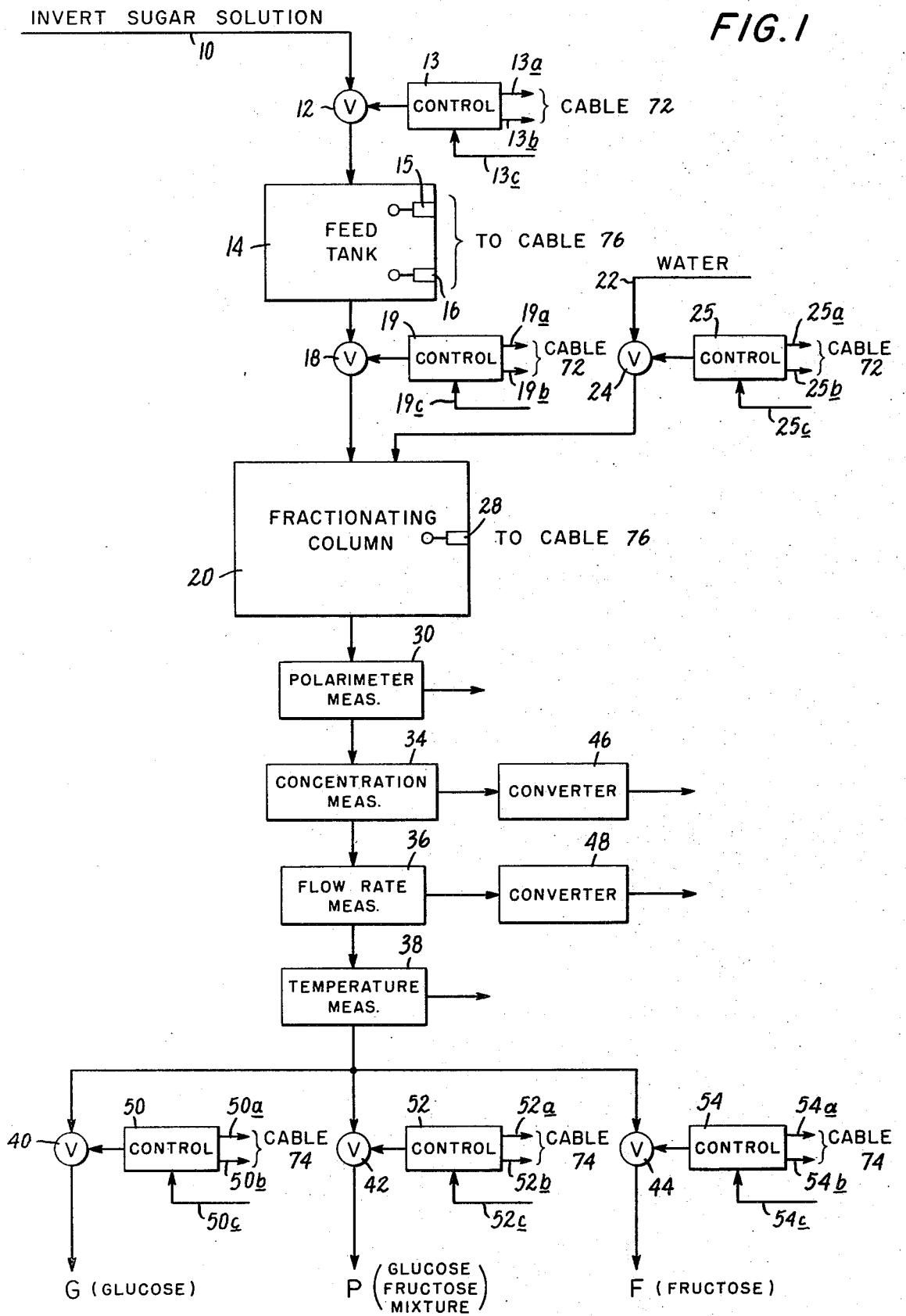
FIG. 1 is a schematic block diagram of an industrial chromatographic fractionating process controlled in accordance with the present invention.

In an illustrative industrial chromatographic fractionating process controlled in accordance with the present invention, as shown in FIG. 1, an invert sugar solution is supplied along an inlet pipe 10 to a valve 12. Operation of the valve 12 is controlled by an associated valve control mechanism 13 under the control of the digital computer control system shown in FIG. 2 and described hereinbelow. Suffice it here to describe the mechanism as including a pair of output terminals 13a and 13b which are coupled to the digital input controller of the FIG. 2 system and which indicate, respectively, the "on" and "off" positions of the valve 12. An input terminal 13c of the mechanism is coupled to the output controller of the FIG. 2 system. Depending on the signal supplied to the input terminal 13c of the mechanism 13, the mechanism will either drive the valve 12 open or closed and the terminals 13a and 13b will have signals appearing thereon reflecting the state of the valve 12.

When opened by the mechanism 13, the valve 12 supplies the invert sugar solution to a feed tank 14. The feed tank 14 includes a pair of surface level indicators 15 and 16 which are coupled to the digital input controller of the FIG. 2 system and which function through the FIG. 2 system to control the operation of the mechanism 13. Specifically, when the height of the invert sugar solution in the feed tank 14 falls below a predetermined level as detected by the indicator 16, the detector generates a signal which causes the computer of the FIG. 2 system to automatically drive the valve 12 to its open position via the mechanism 13 to enable further invert sugar solution to be supplied to the feed tank. On the other hand, when the solution contained in the tank 14 rises above a predetermined level as detected by the indicator 15, the detector will be activated and will generate a signal that instructs the computer to close the valve 12.

The outlet port of the feed tank is coupled to a valve 18 whose operation is controlled by an associated valve control mechanism 19. As with the mechanism 13, the mechanism 19 includes a pair of output terminals 19a and 19b which indicate, respectively, the on and off positions of the valve 18 and an input terminal 19c which is coupled to the digital computer control system shown in FIG. 2. Depending on the signal supplied to the input terminal 19c of the mechanism 19, the mechanism will drive the valve 18 either open or closed. The valve 19 couples the feed tank 14 to one input port of a fractionating column 20.

Operating to supply water from an inlet duct 22 to the other input port of the fractionating column 20 when the valve 18 is closed is a valve 24. The valve 24 has associated therewith a control mechanism 25 which includes a pair of output terminals 25a and 25b which indicate, respectively, the on and off conditions of the valve 24 and an input terminal 25c which is coupled to the digital computer control system of FIG. 2. The computer control system drives the valves 18 and 24 into operation alternately under program control whereby a selected amount of invert sugar solution is first supplied via the valve 18 to the fractionating column 20 for a selected period of time and then water is supplied to the fractionating column 20 during a second period of time.

In the fractionating column 20, the invert sugar solution is chromatographically fractionated to glucose and fructose. In the process, the invert sugar solution and water are fed alternately into the top of the column over the surface of the resin layer. The column 20 of the FIG. 1 system may be of conventional construction and, accordingly, need not be described in detail herein. One such conventional fractionating column is disclosed in British Pat. No. 1,095,210.

A surface level indicator 28 is included within the fractionating column 20 above the resin layer and monitors the height of the diluted invert sugar solution within the fractionating column. Depending on the height of the solution within the column as detected by the detector 28, the valves 18 and 24 will be enabled to supply invert sugar solution and water alternately to the column 20 or will be disabled to stop the supply of solution and water to the column. As above-mentioned, glucose and fructose are separated in the column 20 and glucose, a glucose-fructose mixture, fructose and almost pure water are obtained sequentially from the bottom of the fractionating column 20.

The sequentially emerging solutions are supplied via a polarimeter measuring device 30, a concentration measurement device 34, a flow rate measuring device 36 and a temperature measuring device 38 to three distribution valves 40, 42 and 44. The polarimeter measuring device 30, which may be of the Bendix 143 C type, constantly measures the angle of optical rotation and supplies a signal corresponding to such angle of and supplies a signal corresponding to such angle of optical rotation to an analogue-to-digital converter (described hereinbelow) forming an integral part of the FIG. 2 control system. The concentration measuring device 32, which may be of the Valmet Dens-Air type is coupled via a pressure-current converter 46 to the analogue-to-digital converter of the FIG. 2 system. The Minneapolis Honeywell Co. manufactures pressure-current converters of the type which may be utilized in the present invention.

Figure 2:
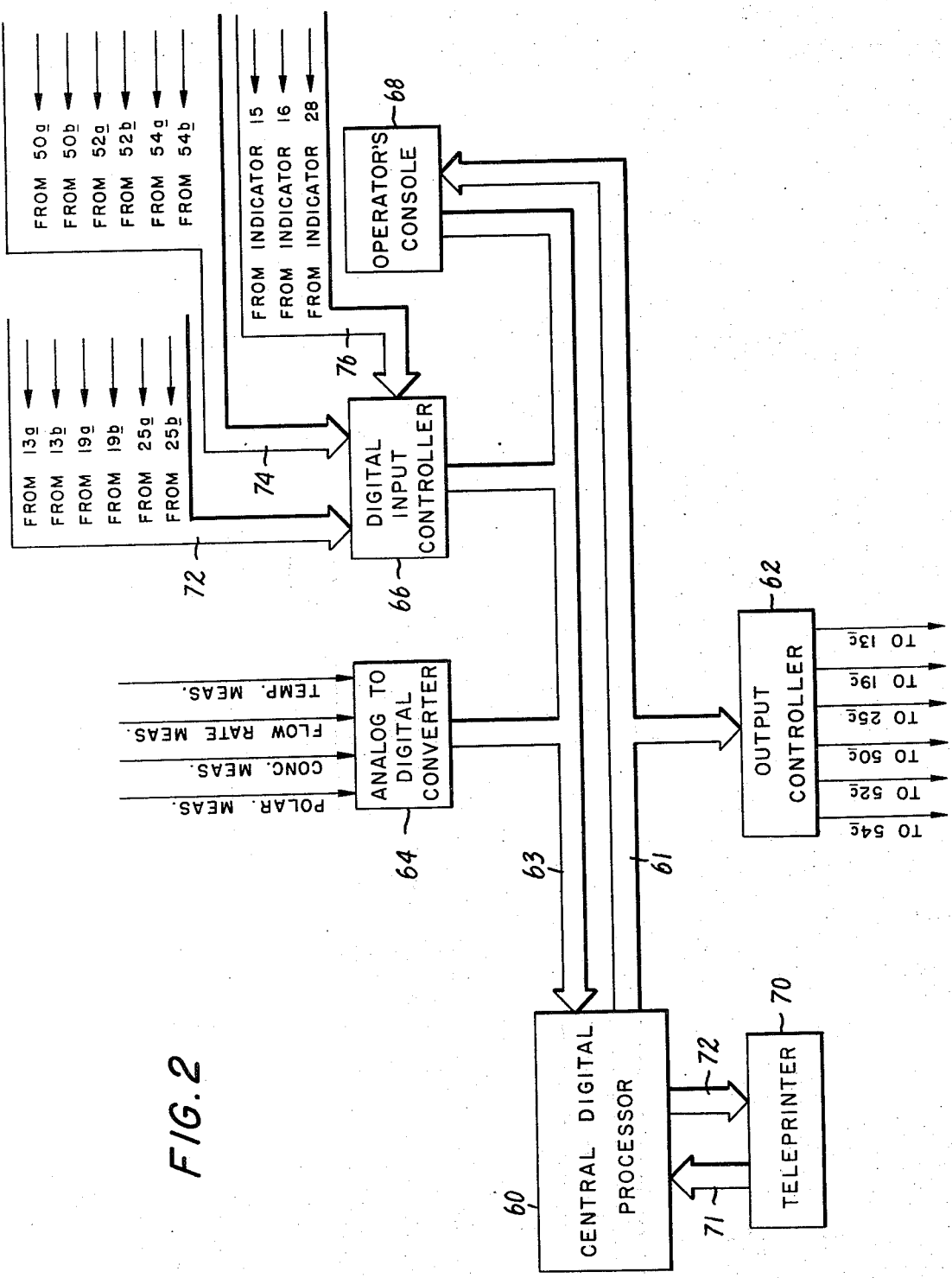
FIG. 2 is a schematic block diagram of the apparatus of the present invention for controlling automatically the process shown in FIG. 1.

The flow rate measuring device 36, which may be of the Foxboro D/P Transmitter 13 A type, constantly supplies a pressure signal to a converter 48 which converts the pressure signal into a current signal and supplies the signal to the analogue-to-digital converter of the FIG. 2 system. Finally, the temperature measuring device 38, which may be of the Rosemund PT 100 type, constantly supplies a signal indicative of the temperatures of the solutions emerging from the fractionating column 20 to the analogue-to-digital converter of the FIG. 2 system. As will be understood, the temperature measurement may be unnecessary if the solutions emerging from the column 20 have the same temperature. Where there is temperature variation, however, the measurement must be made because temperature variations will effect the polarimeter readings, as explained below.

The operation of the distribution valves 40, 42 and 44 are controlled by associated valve control mechanisms 50, 52 and 54 under the control of the FIG. 2 computer control system, as described below. The control mechanisms include output terminals 50a, 50b; 52a, 52b; 54a, 54b, which indicate, respectively, the on and off positions of the valves 40, 42 and 44 and which are coupled to the digital computer control system of FIG. 2. The mechanisms also include input terminals 50c, 52c and 54c which are coupled to the FIG. 2 system and, depending on what part of its program the FIG. 2 computer is carrying out, at least one of the mechanisms 50, 52 or 54 will receive an enabling signal and drive its associated valve into the open position. Emerging from the valves 40, 42 and 44 will be glucose (G), a glucose-fructose mixture (P) and fructose (F), respectively. The emerging solutions will be distributed into different containers, one for each fraction for further processing.

As shown in FIG. 2, the apparatus for controlling automatically the process in FIG. 1 includes a central digital processor 60 which may be of the Nokia PPC 6520.2 type coupled by a cable 61 to an output controller 62, which may be of the Nokia PPU 6537 type and coupled via a cable 63 to an analogue-to-digital converter 64, which may be of the Nokia PPD 6533 type. The cable 63 also couples the processor 60 to a digital input controller 66, which may be of the Nokia PPU 6531 type and an operator's console 68, which may be of the Nokia PPU 6542.1 type. Cable 61 further couples the output controller 62 to an operator's console 68. The FIG. 2 system finally includes a teleprinter 70 which is coupled to the processor 60 via the cables 71 and 72.

As indicated by the labelled output terminals, the output controller 62 supplies, under computer program control, signals that control the operations of the valves 12, 18, 24, 40, 42 and 44 in the fractionating apparatus of FIG. 1. As further shown by the labelled conductors, the polarimeter readings indicating the angle of optical rotation, concentration readings, rate of flow measurements and temperature measurements of the solutions emerging from the fractionating column 20 are supplied to the analogue-to-digital converter 64 and the digital representations of such measurements are supplied to the central digital processor 60. As above mentioned, the temperature measurement will not be necessary if the temperature of the solution emerging from the fractionating column remains constant. Where there is a temperature variation, however, the effect of the variation on the polarimeter reading is taken into account by a correction program based on the nomograph illustrated in FIG. 4, as described below.

Signals indicating the conditions of the feed valves 12, 18, and 24, i.e., 13a, 13b; 19a, 19b; 25a, 25b, are supplied within a cable 72 to the digital input controller 66 and signals indicating the conditions of the distribution valves 40, 42 and 44, i.e., 50a, 50b; 52a, 52b; 54a, 54b, are supplied within a cable 74 to corresponding input terminals of the controller 66. Finally, the signals indicating the levels maintained within the feed tank 14 developed by the indicators 15 and 16 and within the fractionating column 22 developed by the indicator 28 are also supplied within a cable 76 to three other input terminals of the digital input controller 66. The output controller 62 decodes the appropriate instructions received from the digital processor 60 to supply valve command signals to the input terminals 13c, 19c and 25c, 50c, 52c and 54c of the control mechanisms for the valves 12, 18, 24, 40, 42 and 44.

The structure, operation and interconnection between the components of the FIG. 2 system are conventional and need not be described herein. The novelty of the present invention does not reside in connecting such components together, but rather in measuring the angle of optical rotation, concentration, flow rate and temperature of the solutions emerging from the column 20 and supplying the measurements to the processor 60. As described in more detail below, the processor calculates the instantaneous and/or average purity and, when predetermined purity values are reached, the processor 60 controls the distribution of the various fractions (F, P and G) in accordance with a preset program.

Figure 3:
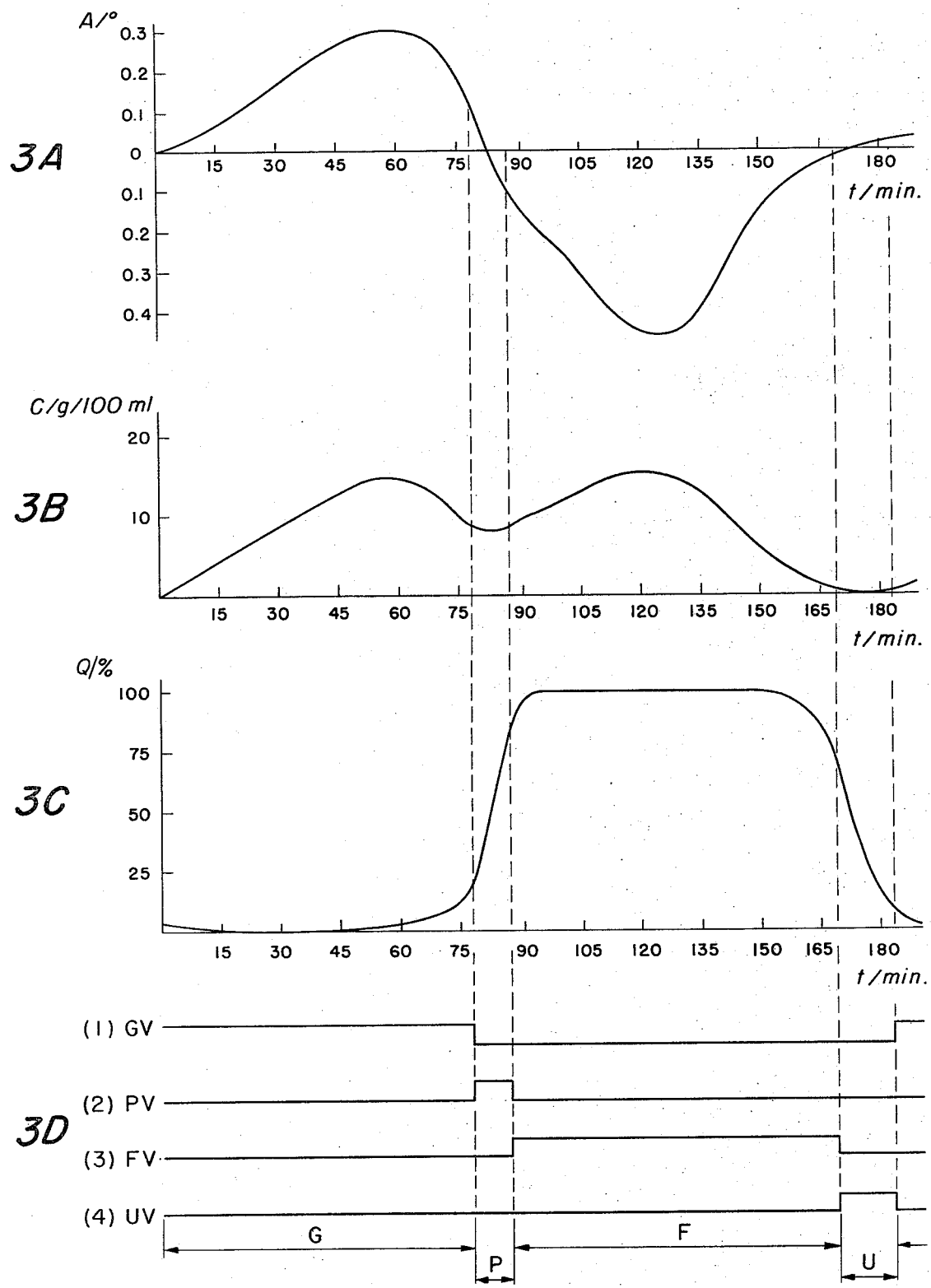
FIGS. 3A–3D illustrate the relationship between the angle of optical rotation (3A), glucose and fructose concentrations (3B), and the purity of fructose (3C), and the consequent opening and closing program (3D) for the distribution valves based on these graphs.

Referring now to FIGS. 3A – 3D, FIG. 3A illustrates the variation in angle of optical rotation (A) as a function of time. FIG. 3B illustrates the glucose and fructose concentrations as a function of time and FIG. 3C illustrates how the purity of fructose in the solution emerging from the fractionating column 20 varies as a function of time. FIG. 3D (1) shows the optimum opening and closing of the glucose distribution valve 40, FIG. 3D (2) and 3D (3) show the optimum opening and closing of the recycling (P) and fructose (F) distribution closing of the recycling (P) and fructose (F) distribution valves 42 and 44, respectively, and FIG. 3D (4) shows the quiescent stage in the fractionating process when all distribution valves are closed.

Figure 4:
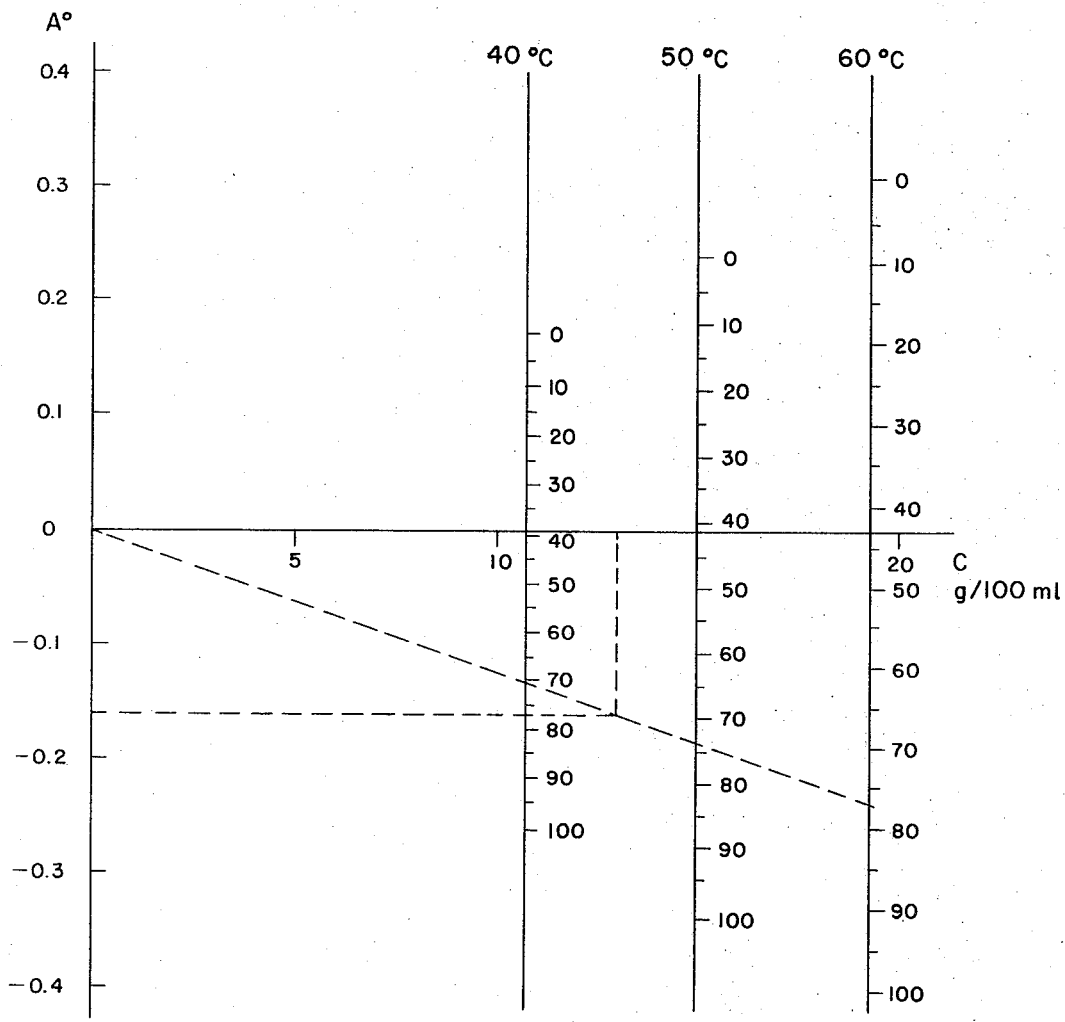
FIG. 4 is a nomograph illustrating the effect of temperature on the determination of fructose.
Figure 5:
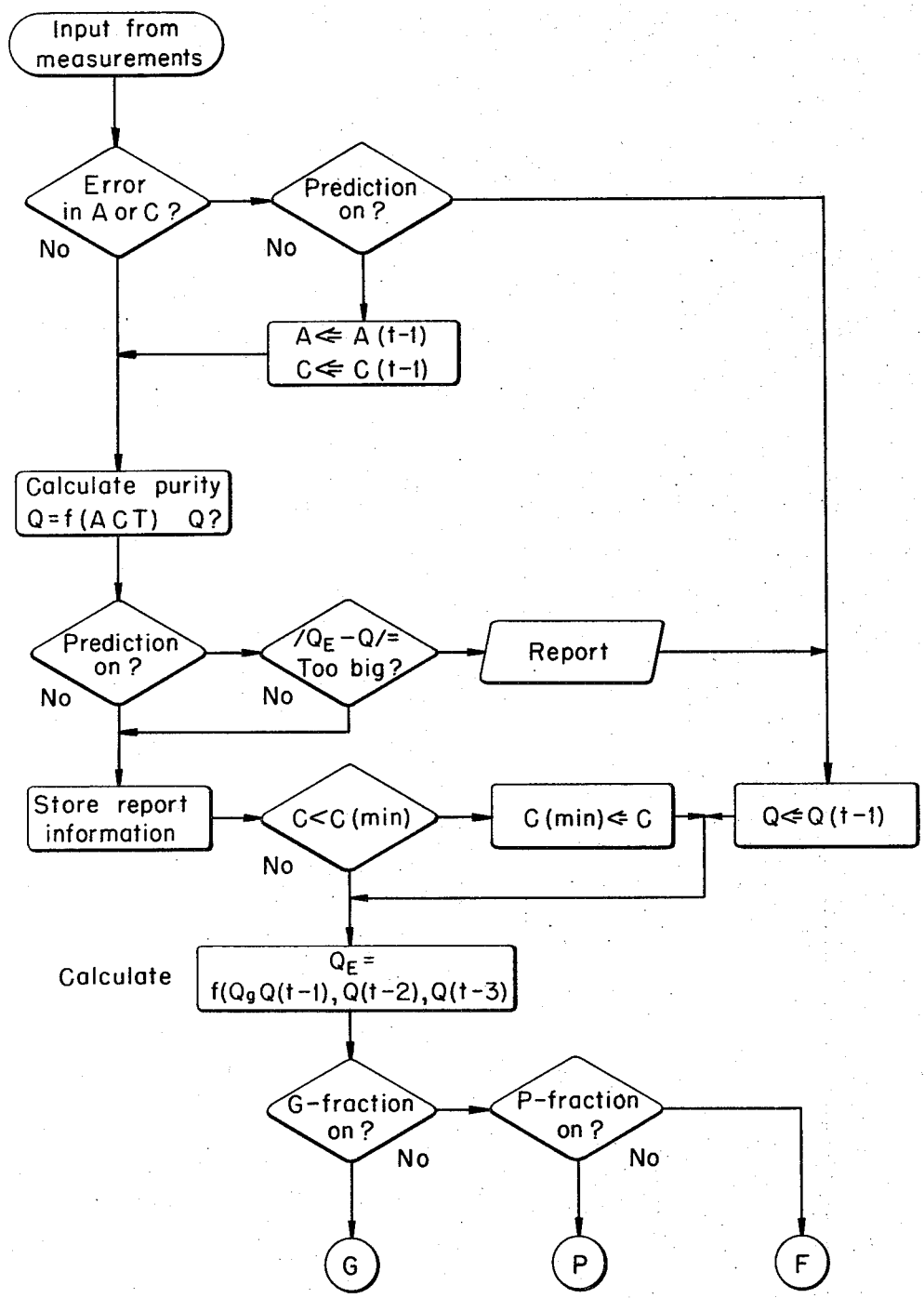
FIGS. 5–8 show flow diagrams of the illustrative computer programs utilized to carry out calculation of the purity and fraction changeover, the glucose fraction, the recycling fraction and the fructose fraction.
Figure 6:
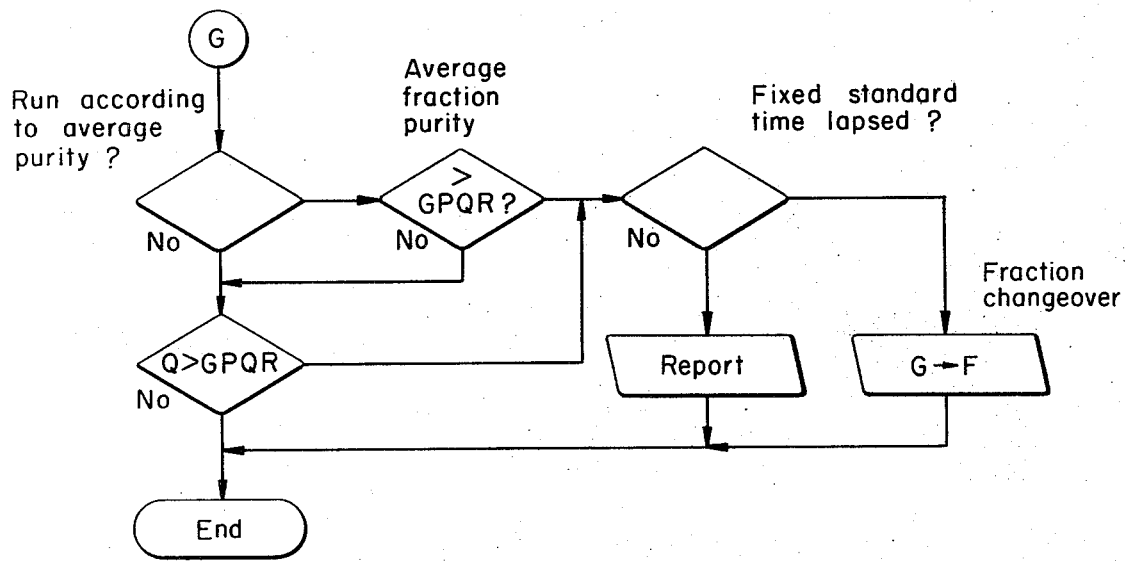
Figure 7:
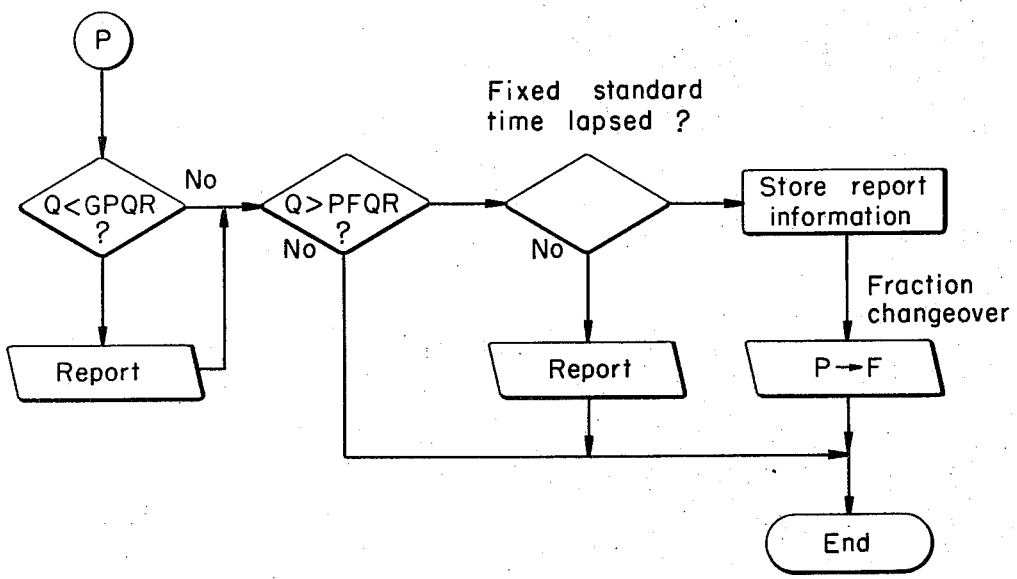
Figure 8:
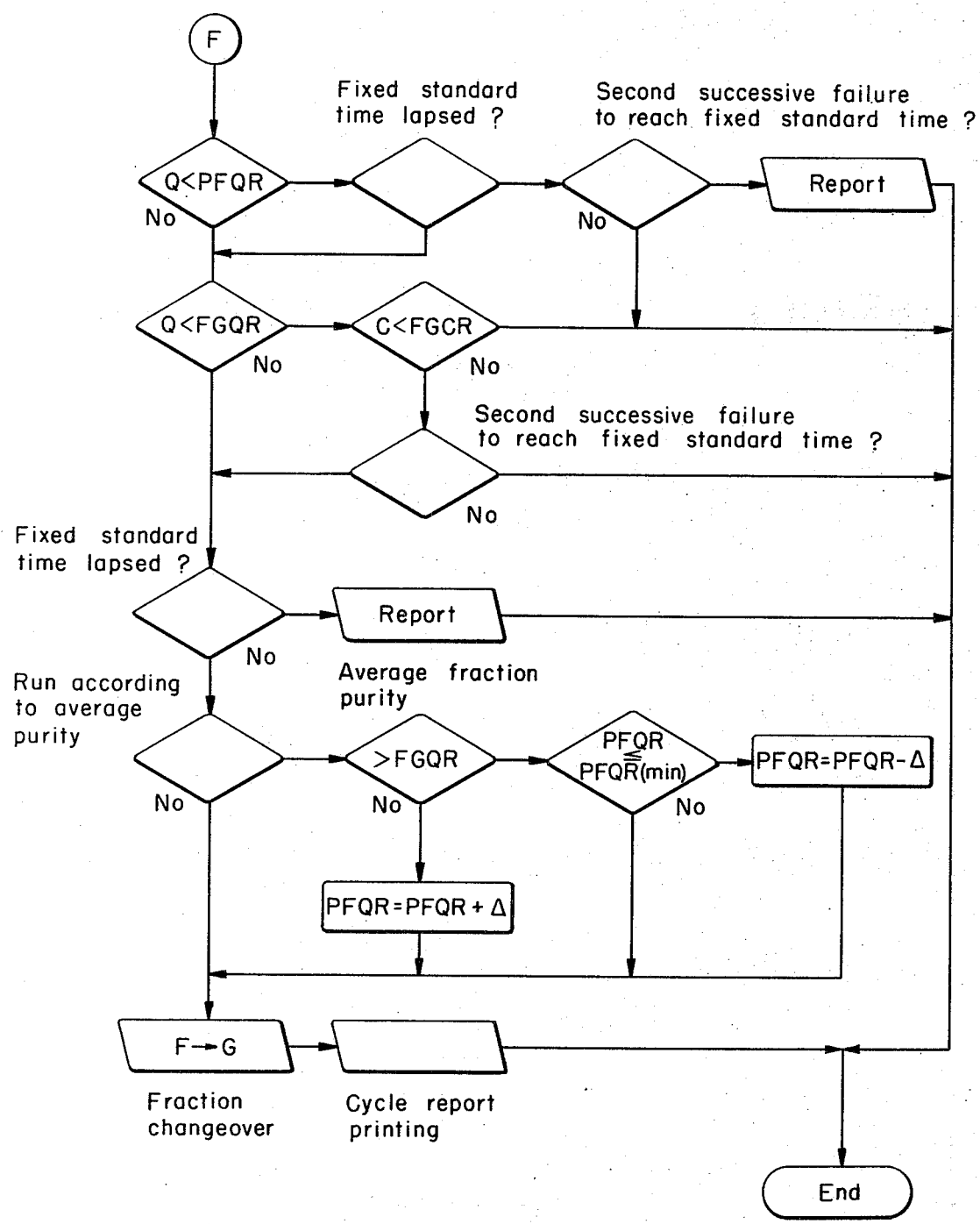

The nomograph illustrated in FIG. 4 shows the effect of temperature on the determination of fructose purity. $A$ is the angle of rotation on a light path of length 2.5 mm measured at the mercury line. $C$ is the concentration ($g/100$ ml).

The fructose concentration in the sugar solution depends on the polarimeter reading and concentration and is given by the following empirical formula (at $+60°C$):

$$F = 62.85C + 3.2 \cdot 10^{-3}C^2 + 2.5 \cdot 10^{-6}C^3 - 4 \cdot 10^3 A/1.4325C + 4.37C^2 \cdot 10^{-5} + 10.5 \times 10^{-8}C^3$$

where
 $F =$ fructose concentration of solution as percent of dry material ($=$ F-purity)
 $C =$ concentration ($g/100$ ml)
 $A =$ angle of optical rotation (in degrees, measured at wavelength 546 mu, length of light path 2.5 mm)

A corresponding equation can be written for glucose purity.

As the temperature of a process operating on an industrial scale never remains completely constant, a temperature correction is included in the computer program.

The above equation can be approximated in a linear form suitable for process control (at $+60°C$):

$$F = 43.509 - 2734.2(A/C),$$

which is of the general form:

$$F = k_1 - k_2(A/C),$$

where the constants $k_1$ and $k_2$ depend upon the measuring conditions such as temperature, wavelength of the light used in the polarimeter and length of the light path in the nomograph of FIG. 4.

The purpose of the separation program is to control the fractionating process and to distribute the solution emerging from the fractionating column 20 into three fractions $G$, $P$ and $F$. The collection and computation of data necessary for the reports can also be included in the separation program.

The process computer 60 (FIG. 2) records, at sufficiently short intervals, for example every half minute, the concentration, polarimeter reading, temperature and rate of flow of the fractionating column. There is a tolerance control for the measured values (it is checked that the measured values are generally within the calibrated area), and incorrect measurement results are not accepted.

The distribution of the solution emerging from the fractionating column 20 is determined on the basis of the F-purity of the solution. The fractions are glucose ($G$), recycling ($P$) and fructose ($F$). The limit values of the fractions are determined by both $F$-value and concentration. Various methods are available for the determination of the $F$-purity. When using instantaneous $F$-value as the operating parameter, the transfer from glucose to recycling and from recycling to fructose is carried out on the basis of instantaneous $F$-values. The limit value between fructose and glucose is determined by either $F$-value or concentration depending upon which of the preset values is first reached. Another method of controlling the fractionating is to use average $F$-purity as a distribution parameter. The required average purity values are given for both fructose and glucose. During distribution of the glucose fraction the average $F$-purity is calculated after each F-purity measurement. As the time for changeover to the recycling fraction approaches the $F$-value increases (the purity of the glucose decreases) until the set value is reached and changeover occurs. A set value for instantaneous F-purity is also included in the control system in order to prevent solution containing too much fructose from passing into the pure fractionated glucose. If the changeover from glucose to recycling is based on the instantaneous F-purity value the glucose fraction will have a lower average F-purity than the set average F-purity value.

Determination of the recycling-fructose changeover using average F-purity as a parameter, cannot be accomplished in the same way as the average purity of the fructose fraction is known only when this phase is completed, and the recycling-fructose changeover takes place at the beginning of the phase. For this reason there is a set value for instantaneous F-purity in addition to the average F-purity. After completion of the F-fraction the computer 60 calculates the average purity of the F-solution obtained and corrects the limit value if necessary, this correction always being in such a manner that the average purity of the fructose remains at the set value. The limit value of glucose-recycling has a maximum permissible figure and there is a similar minimum permissible figure for recycling-fructose below which the computer is not allowed to transfer the limit although the average F-purity required might demand that.

A large error in the calculated purity value can be caused by even a small mistake when the computer 60 uses the above-described formula. If the control of the distribution limits were determined only by the purity values calculated directly from the measurement values the solutions emerging from column 20 might be incorrectly distributed by the computer 60. In order that this may be avoided the computer 60 is programmed to predict each new point on the purity curve, which is taken at, for example, 1 minute intervals. The point calculated from the measured values is compared with the predicted one and that one which is more correct is selected. The new point on the purity curve is predicted by the computer using, for example, the four previous accepted points on the curve and the following formula:

$$Y = X/1 - kX^2$$

In order that the actual curve be followed as closely as possible by the predicted curve based on the above formula, the asymptotes of the predicted curve have a slight shift, for example 5 percent, from the origin. This means that, in practice, the value given by prediction is for instance 105 percent or −5 percent. Percentage values outside the range 0 − 100 percent are however eliminated in the computer program. When comparing the point calculated from measured values with the predicted one the computer also takes into account the slope of the curve at that point. Larger deviations between measured and predicted purity are permissible on steep sections of the curve than on those parts of the curve having only gradual slopes.

The difficulty in dealing with the fructose-glucose limit is that both the polarimeter reading and concentration measurements are registered at the extreme lower ends of the measuring scales. The percentage errors of the measuring scales in general are greater within these regions. Consequently the purity value calculated from the measured values may have extreme variations to either side of the real value and one such extremely erroneous value could cause an incorrect control operation. For this reason fraction changeover is not initiated on the basis of a single point on the purity curve or one concentration measurement, and several, for example three, measurements are required to determine that the limit value has been reached.

In addition to the above safety measures the standard time duration of a fraction is also taken into account as a parameter for the distribution of the fractions. If the measured or calculated values indicate that a fraction should be completed and a new one started but the time measured from the beginning of the fraction is less than the fixed standard time no changeover takes place and error data is printed out on the report teleprinter 70 (FIG. 2).

The flow diagrams of the computer programs for the calculation of purity and fraction changeover, the calculation of the glucose fraction, the calculation of the recycling fraction, and the calculation of the fructose fraction are illustrated in FIGS. 5-8, respectively. The designated symbols in the flow diagrams have the following meanings:

$A$ angle of optical rotation
$C$ concentration
$V$ flow
$T$ temperature
$Q$ F-purity, $Q = f(A,C,T)$
$Q_E$ predicted purity
$G$ glucose
$P$ recycling
$F$ fructose
GPOR attempted average purity of G-purity
GPQR changeover limit as determined by instantaneous purity in the range $G-P$
PFQR changeover limit as determined by instantaneous purity in the range $P-F$
FGQR changeover limit as determined by instantaneous purity in the range $F-G$
FGOR attempted average purity of F-fraction
FGCR changeover limit as determined by concentration in the range $F-G$
$C$ (MIN) minimum concentration during fraction
AN fixed standard time for duration of fraction before next fraction changeover can take place.

Although the invention has been described herein with reference to a specific embodiment, many modifications and variations therein will readily be apparent to those skilled in the art. For example, the processor 60 may be programmed to calculate the amount of dry material in the fractions and the printing of output reports. The control method is suitable for large scale production as any number of fractionating columns can be controlled by one computer on a time-sharing basis. Accordingly, all such variations and modifications are included within the intended scope of the invention as defined by the following claims.

We claim:

1. In a method for automatically controlling an industrial chromatographic process wherein at least two substances are fractionated chromatographically and emerge from the process with sufficient purity to be extracted and wherein at least one other fraction emerges requiring recycling into the process, the improvement comprising continuously measuring the angle of optical rotation, concentration and temperature of the fractions emerging from the process, calculating the instantaneous and average purity values of the fractions as a preselected function of the concentration, angle of optical rotation and temperature of the emerging fractions, automatically distributing the fractions in accordance with the detection of predetermined average purity values for the fractions and selectively utilizing the calculated instantaneous purity values to effect a change in the distribution prior to attainment of the average purity values in order to preclude the contamination of one fraction by another fraction.

2. A method according to claim 1 comprising the further step of continuously measuring the flow rate of the fractions emerging from the process and utilizing such measurements in the calculation of the instantaneous and average purity of the fractions.

3. A method according to claim 2 comprising the further steps of automatically predicting a purity curve in a discrete number of steps, comparing the predicted steps of the purity curve with the measured values of purity and selecting the most accurate of the two steps in the purity curve to control distribution.

4. A method according to claim 1 in which the process to be controlled is the fractionation of invert sugar into fructose, glucose and recycling fractions and wherein the fructose purity is calculated from the measurements according to the following equation approximated in linear form as $$F = k_1 - k_2 (A/C) \text{ wherein}$$

$A$ is the angle of optical rotation and $C$ is the concentration of the emerging fraction from the process and the constants $k_1$ and $k_2$ depend on the measuring condition, including temperature.

5. A method according to claim 4 comprising the further step of automatically modifying the measured angle of optical rotation as affected by the temperature of the emerging fractions in accordance with a predetermined nomograph.

6. A method according to claim 5 wherein a predetermined instantaneous purity value for the fructose is set and wherein the distribution of the fractions is determined in accordance with the detection of the predetermined purity value.

7. A method according to claim 5 wherein predetermined maximum values for the average $F$-purity are set and utilized to control the changeover from distribution of the glucose fraction to distribution of the recycling fraction and wherein predetermined minimum values for the average $F$-purity are set and utilized to control the changeover from distribution of the fructose fraction to distribution of the recycling fraction.

8. A method according to claim 5 wherein predetermined maximum values for the instantaneous $F$-purity are set and utilized to control the changeover from distribution of the glucose fraction to distribution of the recycling fraction and wherein predetermined minimum values for the instantaneous $F$-purity are set and utilized to control the changeover from distribution of the fructose fraction to distribution of the recycling fraction.

* * * * *